US012617038B2

(12) United States Patent
Yamaguchi

(10) Patent No.: US 12,617,038 B2
(45) Date of Patent: May 5, 2026

(54) LASER WELDING METHOD

(71) Applicant: HARMONIC DRIVE SYSTEMS INC., Tokyo (JP)

(72) Inventor: Morihiko Yamaguchi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 746 days.

(21) Appl. No.: 18/007,496

(22) PCT Filed: Oct. 28, 2021

(86) PCT No.: PCT/JP2021/039853
§ 371 (c)(1),
(2) Date: Jan. 31, 2023

(87) PCT Pub. No.: WO2023/073874
PCT Pub. Date: May 4, 2023

(65) Prior Publication Data
US 2024/0269770 A1    Aug. 15, 2024

(51) Int. Cl.
*B23K 26/082*      (2014.01)
*B23K 26/26*       (2014.01)
B23K 103/04       (2006.01)

(52) U.S. Cl.
CPC ............ *B23K 26/082* (2015.10); *B23K 26/26* (2013.01); *B23K 2103/04* (2018.08)

(58) Field of Classification Search
CPC .. B23K 26/082; B23K 26/26; B23K 2103/04; B23K 26/703; B23K 26/32; B23K 26/24; B23K 26/28; B23K 26/22; B23K 26/0622; B23K 2101/18; B23K 2101/006; B23K 26/323; B23K 26/044; B23K 2203/04; B23K 26/244; B23K 26/14; B23K 31/125;

(Continued)

(56) References Cited

U.S. PATENT DOCUMENTS

2018/0361506 A1* 12/2018 Tateyama ............. B23K 26/704
2019/0381601 A1* 12/2019 Matsuo .............. B23K 26/0608

FOREIGN PATENT DOCUMENTS

| JP | S54121249 A | 9/1979 |
| JP | 2019005760 A | 1/2019 |
| JP | 2020078819 A | 5/2020 |

OTHER PUBLICATIONS

International Search Report (PCT/ISA/210) and Written Opinion (PCT/ISA/237) mailed on Dec. 28, 2021, by the Japanese Patent Office as the International Searching Authority for International Application No. PCT/JP2021/039853.

* cited by examiner

*Primary Examiner* — Phuong T Nguyen

(74) *Attorney, Agent, or Firm* — .Buchanan Ingersoll & Rooney PC

(57) ABSTRACT

In a laser welding method for welding a first metal member and a second metal member, a first wobbling process is carried out in which a first laser beam is directed in a first scanning pattern along a butt-joining line and a first welded part is formed. A second wobbling process is subsequently performed in which a second laser beam is directed in a second scanning pattern along the surface of the first welded part formed through the first wobbling process and a second welded part that is wider and shallower than the first welded part is formed overlapping the first welded part. A welded part in which delayed cracking can be prevented or suppressed is thus formed.

5 Claims, 2 Drawing Sheets

(58) Field of Classification Search
CPC ................ B23K 26/20; B23K 26/0066; B23K
26/0626; B23K 26/073; B23K 26/38;
B23K 26/0619; B23K 26/0624; B23K
26/53; B23K 26/0006; B23K 26/0676;
B23K 26/0861; B23K 2103/56; B23K
2101/40
USPC .......... 219/121.63, 121.64, 121.72, 136, 119
See application file for complete search history.

FIG. 2

LASER WELDING METHOD

TECHNICAL FIELD

The present invention relates to a laser welding method for welding a difficult-to-weld material through wobbling-assisted laser welding.

BACKGROUND ART

As is well known, laser welding involves directing a laser beam along a welding location using an optical system and melting a parent material in a short time, thereby making it possible to carry out welding that is not substantially affected by heat. A known laser welding method is to carry out a wobbling process, in which the laser beam is moved using a galvanometer scanner in a direction following the welding location while irradiating the welding location so as to draw a circle, in order to increase the bead width of the weld. Carrying out the wobbling process makes it possible to weld difficult-to-weld materials that are not readily welded through laser welding and to weld different types of metals.

Patent Literature 1 proposes a lap fillet welding method for aluminum alloy plates that is carried out using a wobbling process. In the welding method disclosed in Patent Literature 1, periods in which laser light irradiation is enabled and disabled are repeated in an alternating manner, thereby preventing cracking in a lap-fillet-welded part.

PRIOR-ART LITERATURE

Patent Literature

Patent Literature 1: JP 2020-078819 A

DISCLOSURE OF THE INVENTION

Problems to be Solved by the Invention

When difficult-to-weld materials are joined through wobbling-assisted laser welding, a problem is presented in terms of "delayed cracking," i.e., cracking that occurs at a welding location after a prescribed number of days has elapsed.

It is an object of the present invention to propose a laser welding method in which a wobbling process is used, the laser welding method making it possible to join difficult-to-weld materials or the like such that the form of weld cracking referred to as delayed cracking does not occur.

Means Used to Solve the Above-Mentioned Problems

In order to achieve the above object, the present invention provides a laser welding method for directing a laser beam in a prescribed scanning pattern along a line where a first metal member and a second metal member are butt-joined and welding the first and second metal members, the laser welding method being characterized in that a first wobbling process is carried out in which a first laser beam is directed in a first scanning pattern along the butt-joining line and a first welded part having a prescribed width and depth is formed along the butt-joining line, and a second wobbling process is performed in which a second laser beam is directed in a second scanning pattern along the surface of the first welded part formed through the first wobbling process and a second welded part that is wider and shallower than the first welded part is formed overlapping the first welded part.

For example, by setting the output of the first laser beam high and the amplitude for the first scanning pattern low, the first welded part is formed at a butt-joining interface between the two metal members within the range of a low width and a high depth. Conversely, by setting the output of the second laser beam low and the amplitude of the second scanning pattern high, the second welded part is formed at the butt-joining interface within the range of a high width encompassing the first welded part and a depth shallower than that of the first welded part.

Effects of the Invention

It was confirmed that carrying out a wobbling process in two applications and forming a welded part at a butt-joining interface between two metal members as described above makes it possible to prevent or suppress delayed cracking in the welded part.

BRIEF DESCRIPTION OF THE DRAWINGS

FIG. 2 is a flow chart showing a laser welding method according to the present invention.

MODE FOR CARRYING OUT THE INVENTION

Figure 1:
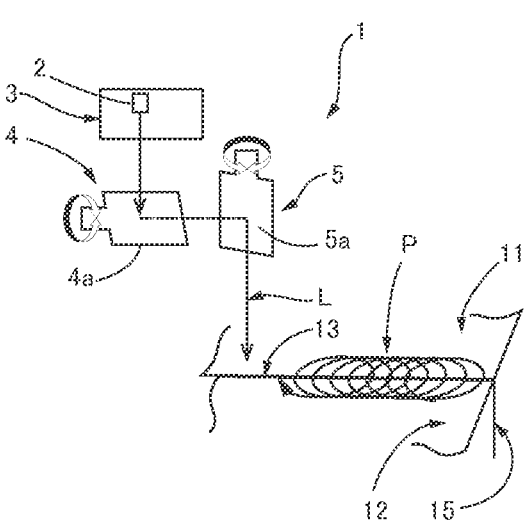
FIG. 1 is a schematic diagram of a laser welding device.

An embodiment of a laser welding method to which the present invention is applied is described below with reference to the accompanying drawings.

A laser welding device 1 used in the present invention has a typical configuration. As shown in FIG. 1, the laser welding device 1 is configured such that a laser beam L emitted from a laser beam generator 3 provided with a laser light source 2 is directed, via scanning mirrors 4a, 5a of a pair of galvanometer scanners 4, 5, along a line 13 where a first metal member 11 and a second metal member 12 to be welded are butt-joined. A wobbling process is carried out in which the scanning mirrors 4a, 5a, which turn about orthogonal axes of rotation, are caused to turn in a synchronized manner, whereby the position to which the laser beam L is directed is scanned in a prescribed scanning pattern P along the butt-joining line 13.

Figure 2:
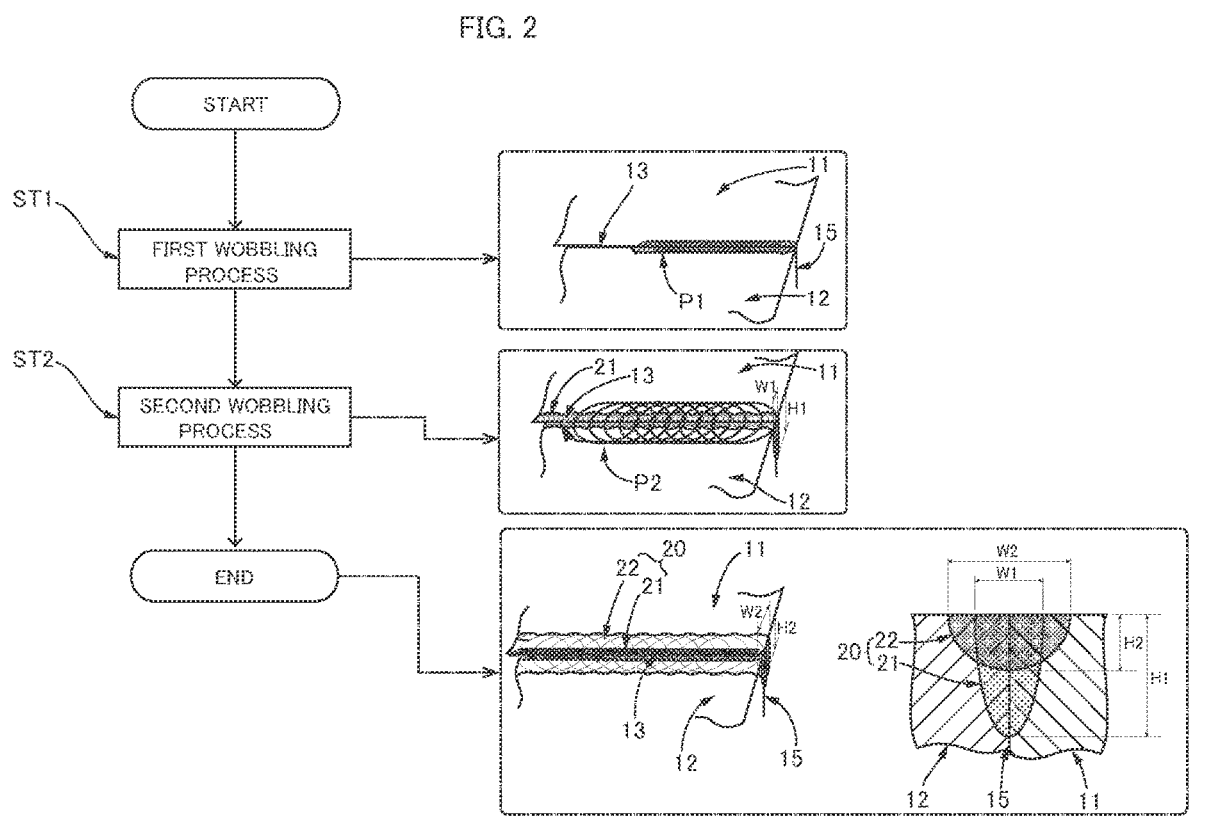

FIG. 2 is a schematic flow chart showing a laser welding method according to the present example. In the welding method according to the present example, the first metal member 11 and the second metal member 12 are positioned in a butt-joined state in the laser welding device 1, and a first wobbling process is carried out along the butt-joining line 13 (ST1). A second wobbling process is subsequently carried out along a first welded part 21 formed along the butt-joining line 13 through the first wobbling process, and a second welded part 22 is formed overlapping the first welded part 21 (ST2).

In the first wobbling process (ST1), a first laser beam having a first output is directed in a first scanning pattern along the butt-joining line 13 as the laser beam L, and the first welded part 21, which has a prescribed width and depth, is formed along the butt-joining line 13. The first scanning pattern P1 in the present example is drawn by moving the radiation position of the first laser beam at a fixed speed in a direction following the butt-joining line 13 while drawing a circle having a first radius centered on the butt-joining line 13. Various patterns can be employed as the first scanning pattern P1.

The first welded part 21 is formed on the first and second metal members 11, 12 along the butt-joining line 13 through the first wobbling process, where W1 is the width of the first welded part 21 on a member surface that is centered on the butt-joining line 13, and H1 is the depth of the first welded part 21 from the member surface in a direction following a butt-joining interface 15.

In the second wobbling process (ST2), a second laser beam having a second output that is less than the first output is directed in a second scanning pattern P2 along the first welded part 21 as the laser beam L, and a second welded part 22 is formed along the butt-joining line 13 so as to overlap the first welded part 21. For example, the scanning speed of the second laser beam is equal to the scanning speed of the first laser beam. The second scanning pattern P2 in the present example is drawn by moving the radiation position of the second laser beam at a fixed speed in a direction following the butt-joining line 13 while drawing a circle having a second radius centered on the butt-joining line 13. The second radius is greater than the first radius. Various patterns can be employed as the second scanning pattern P2.

The second welded part 22 is formed on the first and second metal members 11, 12 along the butt-joining line 13 thereof through the second wobbling process, where W2 is the width of the second welded part 22 on the member surface that is centered on the butt-joining line 13, W2 being greater than W1, and H2 is the depth of the second welded part 22 from the member surface in the direction following the butt-joining interface 15, H2 being less than H1.

Thus, the narrow and deep first welded part 21 is formed between the first and second metal members 11, 12 using the high-output first laser beam, and the wide and shallow second welded part 22 is formed overlapping the first welded part 21 using the low-output second laser beam. Accordingly, it was confirmed that delayed cracking can be prevented or suppressed in a welded part 20 formed by carrying out a wobbling process in two applications.

The inventors conducted a welding test as described below in order to confirm the effect of the laser welding method according to the present invention. Bearing steel (SUJ2) was used as the first metal member 11, and alloy steel for mechanical structures (SNCM 439) was used as the second metal member 12. The output of the first laser beam in the first wobbling process was set to 800 W, and the first radius (wobbling radius) of a circle in the first scanning pattern P1 was set to 0.2 mm. The output of the second laser beam in the second wobbling process was set to 150 W, and the second radius (wobbling radius) of a circle in the second scanning pattern P2 was set to 0.8 mm. As a result, the first welded part 21, which had a depth H1 of about 2.3 mm, was formed along the butt-joining interface 15, and the second welded part 22, which had a width W2 of about 2.3 mm, was formed so as to overlap the first welded part 21. Upon prolonged observation of the welded part 20, it was confirmed that no delayed cracking could be recognized and that an excellent welded part was formed.

The inventors also conducted welding tests for various combinations of metal materials in addition to the welding test for the SUJ2 material, which is alloy steel, and the SNCM 439 material, which is alloy steel for mechanical structures. For example, the inventors conducted a welding test for SCM 415 and SNCM 439, and a welding test for a carbon steel material (S45C) and a spheroidal graphite cast-iron material (FCD). In welding of the steel materials (carbon steel, alloy steel, and cast iron), the outputs of the first and second laser beams were set, as appropriate, within a range up to about 1,000 W, and the wobbling radii (amplitudes) of the scanning patterns were set, as appropriate, within a range up to about 1.0 mm, whereby it was confirmed that excellent welded parts that did not undergo delayed cracking were obtained.

The invention claimed is:

1. A laser welding method for directing a laser beam in a prescribed scanning pattern along a butt-joining line where a first metal member and a second metal member are butt-joined and welding the first and second metal members, the laser welding method comprising:

performing a first wobbling process in which a first laser beam is directed in a first scanning pattern along the butt-joining line, to form a first welded part having a prescribed width and depth along the butt-joining line, and performing a second wobbling process in which a second laser beam is directed in a second scanning pattern along a surface of the first welded part formed through the first wobbling process, to form a second welded part overlapping the first welded part, the second welded part being wider and shallower than the first welded part;

a scanning speed of the first laser beam in the first wobbling process is equal to a scanning speed of the second laser beam in the second wobbling process;

an output of the first laser beam in the first wobbling process is greater than an output of the second laser beam in the second wobbling process; and an amplitude, in a direction orthogonal to the butt-joining line, of the first scanning pattern of the first laser beam in the first wobbling process is less than an amplitude, in the direction orthogonal to the butt-joining line, of the second scanning pattern of the second laser beam in the second wobbling process.

2. The laser welding method according to claim 1, wherein:

the first scanning pattern is such that a position to which the first laser beam is directed moves in a direction following the butt-joining line while being drawn in a circle having a first radius, a center of the circle being located at a point on the butt-joining line; and the second scanning pattern is such that a position to which the second laser beam is directed moves in a direction following the butt-joining line while being drawn in a circle having a second radius that is less than the first radius, a center of the circle having the second radius being located at a point on the butt-joining line.

3. The laser welding method according to claim 2, wherein each of the first and second metal members to be welded is composed of carbon steel, alloy steel, or cast iron.

4. The laser welding method according to claim 3, wherein the output of the first laser beam is set to a value equal to or less than 1,000 W, and the second radius of the second scanning pattern is set to a value equal to or less than 1.0 mm.

5. The laser welding method according to claim 2, wherein:

the first metal member is an SUJ2 material, and the second metal member is an SNCM material;

the output of the first laser beam in the first wobbling process is 800 W, and the first radius of the first scanning pattern is 0.2 mm; and the output of the second laser beam in the second wobbling process is 150 W, and the second radius of the second scanning pattern is 0.8 mm.

* * * * *